May 13, 1952 — C. BURKHART — 2,596,810
APPARATUS FOR ILLUMINATION OF SCALE DIALS
Filed Feb. 23, 1949
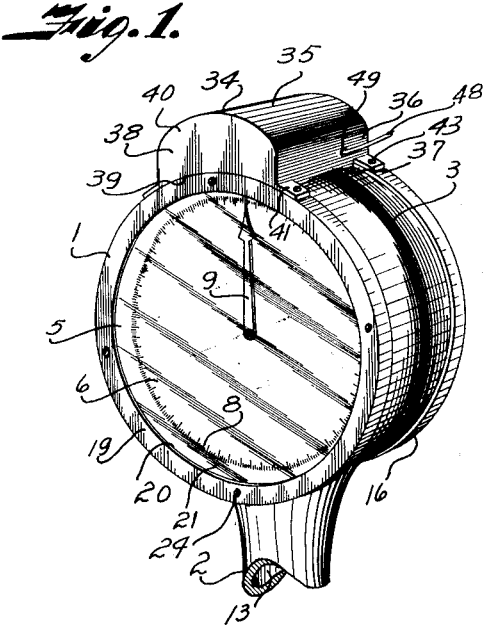
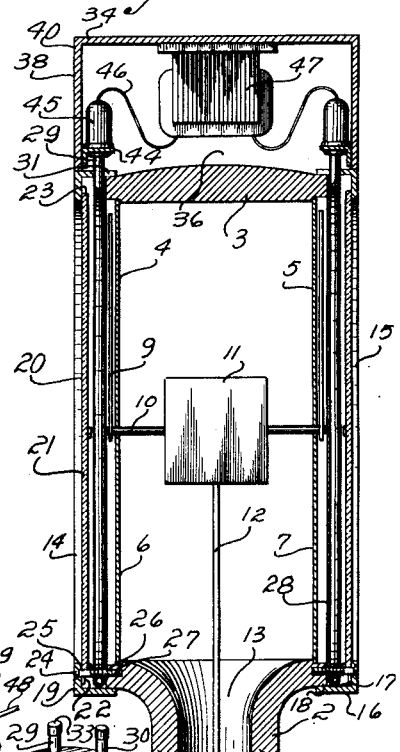
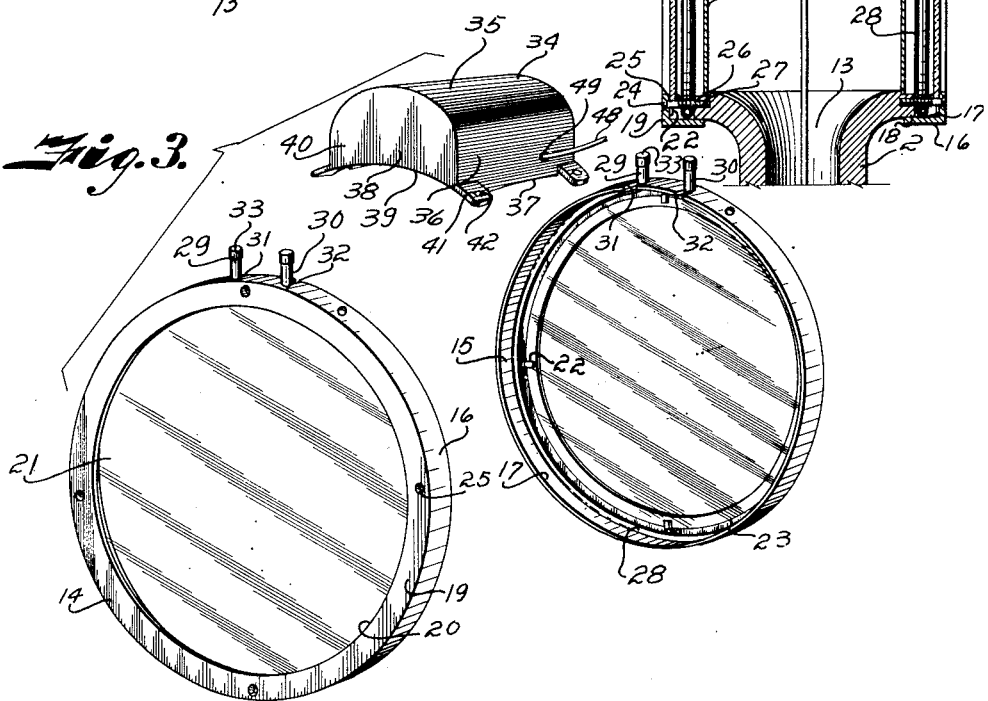
Inventor
Charles Burkhardt
By Fishburn & Mullendore
Attorneys Patented May 13, 1952

2,596,810

UNITED STATES PATENT OFFICE 2,596,810

APPARATUS FOR ILLUMINATION OF SCALE DIALS

Charles Burkhart, Kansas City, Mo.

Application February 23, 1949, Serial No. 77,963

1 Claim. (Cl. 240—2.11)

This invention relates to an apparatus for illumination of weight scale dials and more particularly to a kit of pre-assembled units adapted for installation on conventional scale cases to provide illumination for the scale dials.

There are many conventional scales for indicating weight of merchandise wherein the weight is indicated by a hand moving over the dial which is mounted in a scale case supported by a pedestal from the base on the scale, said base carrying the platform on which the merchandise to be weighed is placed. It is conventional for the scale case to have oppositely arranged faces each of which has dials and indicating hands. Various means such as brackets carrying incandescent lights and the like have been used for illuminating said dials, whereby both the customer and the clerk can see the indicated weight of the merchandise.

The scales must be accurate and in States having regulations regarding the periodic testing of such equipment it is preferable not to disturb the operating mechanism in making any modifications of the illuminating devices. The present invention provides tubular lights in the form of rings mounted adjacent the peripheries of the scale dials whereby substantially uniform illumination is provided for said dials. The tubes and electrical equipment, therefore, are particularly adapted for unit assembly whereby the assembled units may be placed on the scale case and put in operation without disturbing any of the operating mechanism of the scale.

The objects of the invention are to provide a circular tubular light and mounting therefor adjacent the periphery of a scale dial for illumination of same, said tube mounting apparatus supporting a housing enclosing electrical apparatus for said tubular light; to provide a unit assembly consisting of the circular tubular light, bezel, and glass face adapted for application to a scale case to position the light tube adjacent the periphery of the scale dial and a unit assembly of a housing enclosing transformer and electrode housing for receiving the electrodes or terminals of the light tubes, said housing being adapted to be supported on the bezels after same are applied to the scale case; to provide tubular lighting apparatus adapted for unit assembly for quick and easy installation on conventional scale cases for converting the illumination of the dials thereof to illumination by tubular light without disturbing the scale operating mechanism; to provide scale illumination apparatus which is easily and economically manufactured and assembled, adapted to be attached to a conventional scale case at the place of use of said scale to efficiently and uniformly illuminate the scale dial, all of the illuminating means, electrical apparatus therefor being exterior of the case and dial whereby the illumination equipment may be maintained without disturbing the scale mechanism.

In accomplishing these and other objects of the present invention, I have provided improved details of structure, the preferred forms of which are illustrated in the accompanying drawings wherein:

Fig. 1 shows a perspective view of a conventional scale case and upper portion of the pedestal therefor with the illumination apparatus embodying the present invention mounted on said case;

Fig. 2 is a vertical sectional view through the scale case and the illumination apparatus;

Fig. 3 is a disassembled perspective view of the three assembled units necessary to convert a conventional scale to illumination by tubular lights.

Referring in more detail to the drawings:

1 designates a scale case carried on a hollow pedestal 2 supported on a base (not shown) as in conventional weight scales. The scale case is formed by a substantially cylindrical wall 3 and has open ends 4 and 5. Mounted adjacent the ends of the scale case are dials 6 and 7 having suitable graduations 8 adjacent their peripheries whereby movement of indicators 9 into registry with the various graduations indicates the weight of the article on the scale platform, the indicator 9 being mounted on a shaft 10 rotatably mounted coaxially of the dials 6 and 7. The shaft 10 is rotated by a suitable conventional mechanism enclosed in a housing 11 and operated by a rod 12 or the like which extends through the bore 13 in the pedestal 2, said rod being moved in response to movement of the scale platform, as in conventional practice. The usual bezel and glass face on each end of the scale case are removed for mounting of the illumination device and electrical equipment therefore as now to be described.

Bezels 14 and 15 are formed and adapted to be applied to the ends of the scale case, said bezels having angular shaped cross sections, the peripheral flange 16 of which is of suitable size whereby the free edge thereof engages over the ends of the wall 3 with the inner face 17 of the flange 16 engaging the outer periphery 18 of the wall 3. The opposite edge of the peripheral flange 16 terminates in an annular flange 19, said flange being of such width as to provide a central opening 20 substantially the same size as the inner diameter of the wall 3. Suitably mounted on the inner surface of the flange 19 is a glass face 21, said face being held in place by suitable fastening devices such as clips 22 whereby the outer periphery 23 of said face is spaced from the inner face 17 of the flange 16 permitting screws or the like 24 to extend through apertures 25 in the flange 19 between the periphery 23 and the flange 16. The screws have threaded shanks 26 adapted to be screwed into the threaded bores 27 in the end faces 4 and 5 of the scale case.

Tubular lights 28 for example cold cathode tubes or gas filled tubular lights are arranged in each of the bezels, each tube being formed substantially circular or annular in shape and of such size as to substantially engage the inner faces 17 of the flanges 16, said tubes terminating in spaced ends 29 and 30 which are turned upwardly and extend through notches 31 and 32 respectively in the flanges 16, said ends 29 and 30 being supplied with terminals 33 forming the electrical connection for said tubes.

A housing 34 is mounted on the scale case to enclose electrical equipment, said housing having a curved top wall 35 terminating in downwardly directed side walls 36 having a lower edge 37 shaped to engage the outer surface of the scale case wall 3. The top and side walls are connected at their ends with end walls 38 closing the ends of said housing, said end walls having a lower edge 39 adapted to engage the outer peripheries of the flanges 16, the housing being of such length that the outer faces 40 of the end walls 38 lie in the same plane as the outer face of the flange 19. Adjacent the lower edges 37 of the side walls 36 are outwardly extending ears 41 adapted to rest on the surface of the flange 16, said ears being provided with apertures 42 to receive suitable fastening devices such as screws 43 for securing the housing 39 to the bezels 15. Secured to the inner surface of the end walls 38 are angular brackets 44 adapted to carry electrode housings 45, said housings being positioned in alignment with the ends 29 and 30 of the tubular lights whereby when the housing is placed on a scale case as shown in Figs. 1 and 2, the electrode housings will receive the terminals 33 of the ends 29 and 30 of the tubular lights to make electrical contact therewith. The electrode housings are connected by suitable conductors 46 with the secondary of a transformer 47 suitably secured to the top walls 35 of the housing, the primary of said transformer having connection with suitable conductor 48 which extends through an aperture 49 in the side walls of the housing 39, said conductor 48 being suitably connected to a source of electrical energy.

The bezels, glass face, and rings are assembled in the place of manufacture to form units such as shown in Fig. 3. Also the housing 39 is formed and electrode housings and transformer secured therein.

When it is desired to convert the conventional scale to provide illumination by annular tubular lights for the dials, the conventional bezels and glass face are removed. Without disturbing the indicator 9 or any of the scale operating mechanism, the bezels 15, together with the glass faces and the tubular lights assembled therein, are applied to the scale case with the ends of the flanges 16 engaging over the periphery 18 of the wall 3 of the scale case, said bezels being secured in place by means of the screws 24. Housing 39, together with electrode housings and transformer, is then placed over the ends 29 and 30 of the tubular lights whereby the electrode housings are aligned with the said ends of the tubular lights and downward movement of the electrode housing 39 will move the terminals 33 into the electrode housings 45 to make electrical contact therewith. The screws 43 are then applied to secure the housing to the bezels 15. The conversion is then complete; and by connecting the conductor 48 with a suitable source of electrical energy, the scale dial will be illuminated by tubular lights and the scale can be utilized. Such a conversion can be performed in a very short time with substantially no delay in the use of the scale.

What I claim and desire to secure by Letters Patent is:

Apparatus for illumination of weight scale dials comprising, a bezel having a peripheral flange one edge of which is adapted to extend over the side edge of a scale case in engagement with the periphery thereof, an annular flange extending inwardly from the other edge of the peripheral flange and spaced from said side edge of the scale case, said peripheral flange having spaced openings therein, a transparent face member secured to the annular flange in engagement with the surface thereof adjacent the scale case to close the opening formed by said flange, means for securing the bezel to the scale case, an annular tubular light engaging the inner surface of the peripheral flange and supported between the transparent face member and the scale case whereby the annular flange and transparent face member are between the light and an observer, said tubular light having spaced parallel ends terminating in outwardly directed portions in the plane of the tubular light and extending through the openings in the peripheral flange, said outwardly directed portions having terminals thereon, a housing having top, side and end walls, said end and side walls of the housing having lower edges conforming to the outer contours of the bezel and scale case respectively, a transformer including a primary and secondary in the housing, an angle member in the housing and on one of the end walls, spaced parallel receptacles mounted on the angle member in alignment with the spaced openings in the peripheral flange for receiving the terminals of the tubular light end portions therein in electrical contact, electric conductors connecting said receptacles to the secondary of the transformer, and means securing said housing to the bezel for supporting said housing on the bezel exteriorly of the scale case whereby the bezel, light and housing may be mounted for illuminating the scale dials without disturbing weighing mechanism in the scale case.

CHARLES BURKHART.

REFERENCES CITED

The following references are of record in the file of this patent:

UNITED STATES PATENTS

| Number | Name | Date |
|---|---|---|
| 1,356,602 | Crane | Oct. 26, 1920 |
| 1,798,199 | Gans | Mar. 31, 1931 |
| 1,901,100 | Hoffritz | Mar. 14, 1933 |
| 2,278,951 | Smith et al. | Apr. 7, 1942 |
| 2,290,750 | Howe et al. | July 21, 1942 |
| 2,406,896 | Owen | Sept. 3, 1946 |